United States Patent
Chida

(10) Patent No.: US 10,205,921 B2
(45) Date of Patent: Feb. 12, 2019

(54) IMAGE PROCESSING DEVICE, CONTROL METHOD FOR IMAGE PROCESSING DEVICE, AND STORAGE MEDIUM STORING PROGRAM

(71) Applicant: CANON KABUSHIKI KAISHA, Tokyo (JP)

(72) Inventor: Hiromasa Chida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/331,691

(22) Filed: Oct. 21, 2016

(65) Prior Publication Data
US 2017/0127030 A1 May 4, 2017

(30) Foreign Application Priority Data
Oct. 29, 2015 (JP) ................................. 2015-213179

(51) Int. Cl.
| | | |
|---|---|---|
| *G06T 15/80* | (2011.01) | |
| *H04N 9/31* | (2006.01) | |
| *G06T 11/60* | (2006.01) | |
| *H04N 21/41* | (2011.01) | |
| *H04N 21/485* | (2011.01) | |

(Continued)

(52) U.S. Cl.
CPC ........... *H04N 9/3185* (2013.01); *G06T 11/60* (2013.01); *H04N 9/3147* (2013.01); *H04N 9/3155* (2013.01); *H04N 9/3182* (2013.01); *H04N 21/4122* (2013.01); *H04N 21/4854* (2013.01); *G03B 21/13* (2013.01); *G03B 37/04* (2013.01); *G06F 3/0482* (2013.01)

(58) Field of Classification Search
CPC ................................. H04N 9/28; G06T 15/80
USPC ......................................................... 348/747
See application file for complete search history.

(56) References Cited

U.S. PATENT DOCUMENTS

2011/0292080 A1   12/2011  Oka
2013/0222386 A1*   8/2013  Tannhauser ............ G06T 11/60
                                                                345/428

(Continued)

FOREIGN PATENT DOCUMENTS

| | | |
|---|---|---|
| CN | 103731648 A | 4/2014 |
| CN | 104935901 A | 9/2015 |
| JP | 2009-200613 A | 9/2009 |

*Primary Examiner* — Jefferey F Harold
*Assistant Examiner* — Sihar A Karwan
(74) *Attorney, Agent, or Firm* — Canon U.S.A., Inc. IP Division

(57) ABSTRACT

An image processing device causing a projection unit to project an image includes: a detection unit that detects an operation mode of the image processing device; and a projection control unit that causes the projection unit to project a menu image with brightness corresponding to the operation mode detected by the detection unit so that, if the operation mode detected by the detection unit is a first operation mode in which alignment of projection regions of a plurality of projection units is performed for a multi-screen display, of the menu image projected by the projection unit, a portion corresponding to an overlapping region where the projection regions of the plurality of projection units overlap each other in the multi-screen display is made brighter than the portion in a case where the operation mode detected by the detection unit is a second operation mode in which the alignment has been completed.

11 Claims, 5 Drawing Sheets

(51) Int. Cl.
    *G06F 3/0482*    (2013.01)
    *G03B 21/13*     (2006.01)
    *G03B 37/04*     (2006.01)

(56) References Cited

U.S. PATENT DOCUMENTS

2014/0104581 A1    4/2014    Yoshimura
2014/0104582 A1    4/2014    Mori

* cited by examiner

IMAGE PROCESSING DEVICE, CONTROL METHOD FOR IMAGE PROCESSING DEVICE, AND STORAGE MEDIUM STORING PROGRAM

BACKGROUND OF THE INVENTION

Field of the Invention

The present invention relates to an image processing device, a control method for the image processing device, and a storage medium storing a program and, in particular, is suitably used for displaying a plurality of images having respective regions overlapping each other to provide a single screen (multi-screen display).

Description of the Related Art

In related art, a multi-screen display (single screen) is provided using a plurality of projection image display devices (projectors). In this case, regions overlapping each other are provided in respective images projected from projection image display devices adjacent to each other.

As such a type of technique, Japanese Patent Laid-Open No. 2009-200613 discloses the following technique. That is, when two split images are displayed in such a manner that parts of respective projection regions overlap each other, cross-hair guides for adjustment are displayed in, of the respective split images, portions where the respective projection regions are to overlap each other, and the cross-hair guides for adjustment of the respective split images are aligned with each other to align edges of the two split images with each other. Furthermore, luminance of each of the portions where the respective projection regions are to overlap each other is adjusted so that, when the two split images are combined, a luminance of 100% is obtained.

In the technique disclosed in Japanese Patent Laid-Open No. 2009-200613, however, there is a possibility that the visibility of the cross-hair guides for adjustment displayed in, of the two split images, the portions where the respective projection regions are to overlap each other is reduced because the cross-hair guides for adjustment are generated in respective projectors.

SUMMARY OF THE INVENTION

An image processing device that causes a projection unit to project an image is provided. The image processing device includes: a detection unit configured to detect an operation mode of the image processing device; and a projection control unit configured to cause the projection unit to project a menu image with brightness corresponding to the operation mode detected by the detection unit so that, if the operation mode detected by the detection unit is a first operation mode in which alignment of projection regions of a plurality of projection units is performed for a multi-screen display, of the menu image projected by the projection unit, a portion corresponding to an overlapping region where the projection regions of the plurality of projection units overlap each other in the multi-screen display is made brighter than the portion in a case where the operation mode detected by the detection unit is a second operation mode in which the alignment has been completed.

Further features of the present invention will become apparent from the following description of exemplary embodiments with reference to the attached drawings.

DESCRIPTION OF THE EMBODIMENTS

First Embodiment

Figure 1:
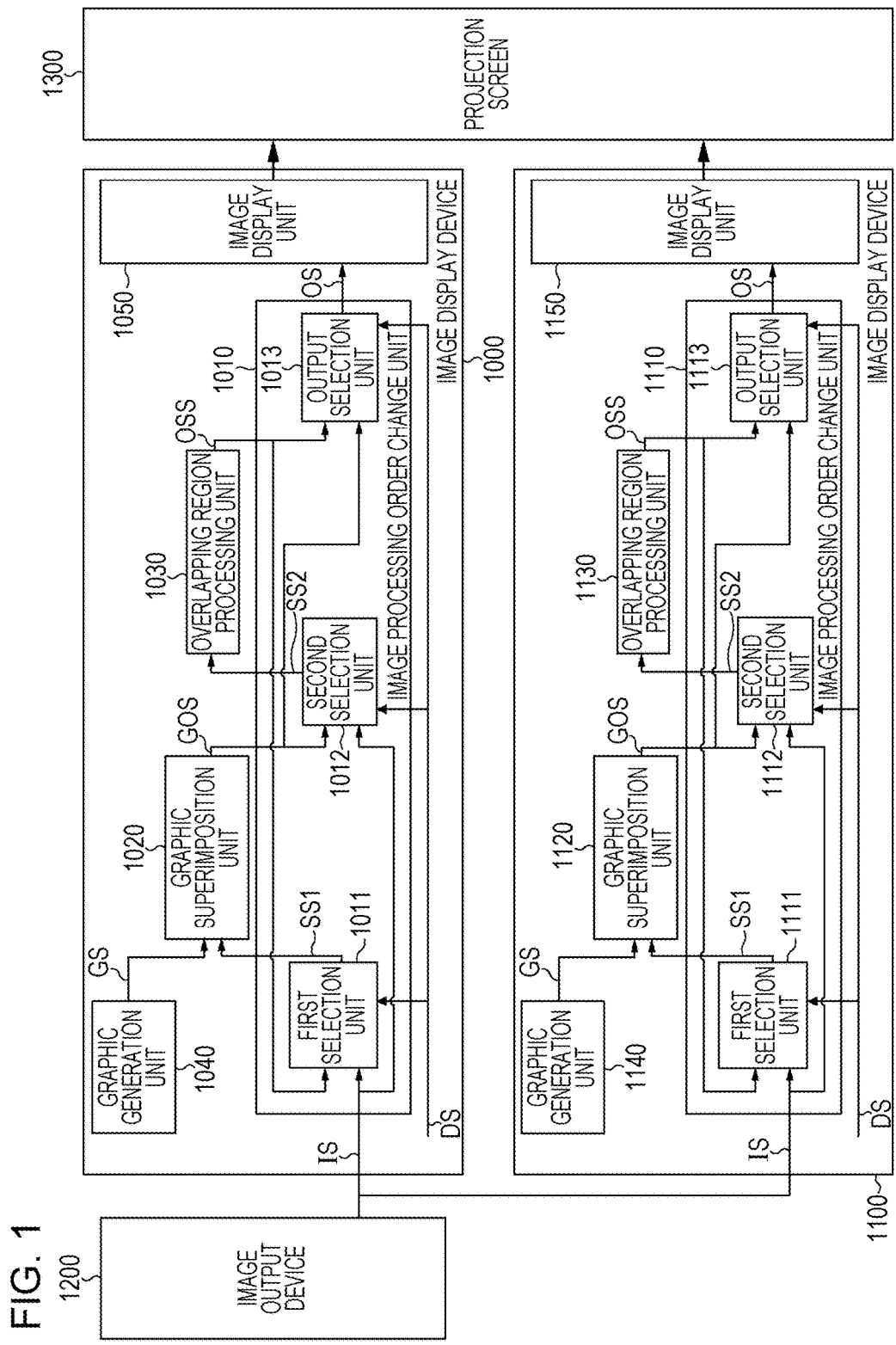
FIG. 1 illustrates a first example of the configuration of a multi-projection system.

FIG. 1 illustrates an example of the configuration of a multi-projection system. FIG. 1 illustrates, as an example, the case where the multi-projection system outputs a multi-screen display with two image display devices 1000 and 1100.

In FIG. 1, the multi-projection system includes the image display devices 1000 and 1100, an image output device 1200, and a projection screen 1300.

The image output device 1200 splits image data to be displayed as a multi-screen display on the projection screen 1300 into two regions and outputs pieces of image data of two split regions to the respective image display devices 1000 and 1100. The pieces of image data of the two split regions contain pieces of image data of respective regions having a specific width and overlapping each other. That is, any of the pieces of image data contains image data of a region covering a boundary between the two split regions and having a specific width. In the following description, regions having a specific width and overlapping each other are each referred to as an overlapping image region where appropriate.

The image display devices 1000 and 1100 are projection image display devices. The image display devices 1000 and 1100 each receive, as an image signal to be processed, an image signal IS output from the external image output device 1200. The image display devices 1000 and 1100 each superimpose an on-screen display (OSD) image serving as an example of an image for superimposition on the image signal IS. Furthermore, the image display devices 1000 and 1100 each subject an overlapping image region to overlapping image processing. The image display devices 1000 and 1100 each project an image subjected to the superimposition of the OSD image and the overlapping image processing onto the projection screen 1300. In this embodiment, as an example, the case where, as an OSD image, a graphic for performing at least one of displaying various settings and changing various settings is superimposed on an image signal will be described.

In this embodiment, assume that two image display devices 1000 and 1100 are arranged horizontally. However, the number of image display devices is not limited to two. Three or more image display devices may be used to provide a multi-screen display. The arrangement of image display devices is not limited to a horizontal arrangement. For example, image display devices may be arranged vertically. Furthermore, a plurality of image output devices may be provided.

Figure 2:
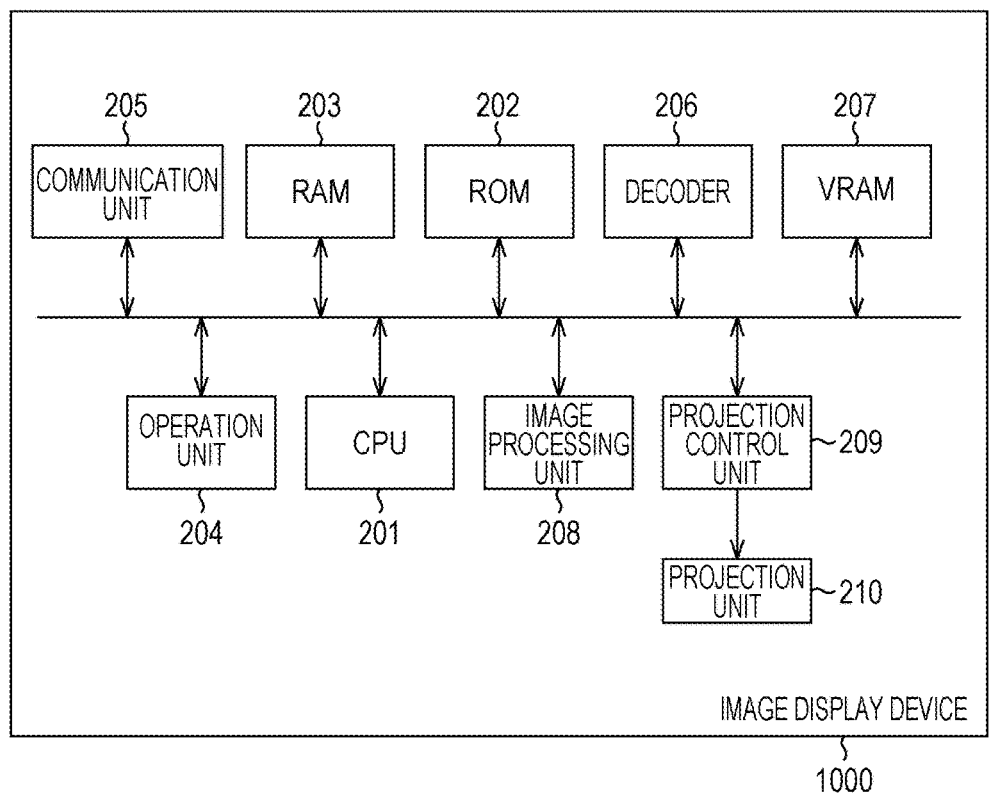
FIG. 2 illustrates an example of a hardware configuration of an image display device.

FIG. 2 illustrates an example of a hardware configuration of the image display device 1000. Hardware of the image display device 1100 can be implemented with the same configuration as that of the image display device 1000. Thus, hardware of the image display device 1000 will now be described, and a detailed description of the hardware of the image display device 1100 is omitted.

A central processing unit (CPU) 201 controls the entire image display device 1000. The CPU 201 is activated in accordance with a program stored in a read only memory (ROM) 202 and loads the program stored in the ROM 202 into a random access memory (RAM) 203 to execute it. An operation unit 204 is a unit through which a user provides an instruction to the image display device 1000 and has a button or the like. The CPU 201 causes the image display device 1000 to operate in accordance with an operation input from the operation unit 204.

A communication unit 205 stores an image signal received from the image output device 1200 into the RAM 203. A decoder 206 decodes the image signal stored in the RAM 203 and loads the decoded image signal into a video RAM (VRAM) 207. An image processing unit 208 subjects the image signal stored in the VRAM 207 to certain image processing. A projection control unit 209 reads out the image signal subjected to the image processing that is stored in the VRAM 207 and transfers the image signal to a projection unit 210. The projection unit 210 projects an image based on the image signal supplied from the projection control unit 209 onto the projection screen 1300.

Next, an example of a functional configuration of the image display device 1000 will be described in detail. A functional configuration of the image display device 1100 can be implemented with the same functional configuration as that of the image display device 1000. Thus, the functional configuration of the image display device 1000 will now be described, and a detailed description of the functional configuration of the image display device 1100 is omitted.

The image display device 1000 includes an image processing order change unit 1010, a graphic superimposition unit 1020, an overlapping region processing unit 1030, a graphic generation unit 1040, and an image display unit 1050.

The graphic generation unit 1040 generates a graphic, such as a multi-screen menu (adjustment menu), and outputs it as a graphic signal GS. The image display unit 1050 receives an output signal OS output from the image processing order change unit 1010 and projects it to the projection screen 1300.

Figure 4A:
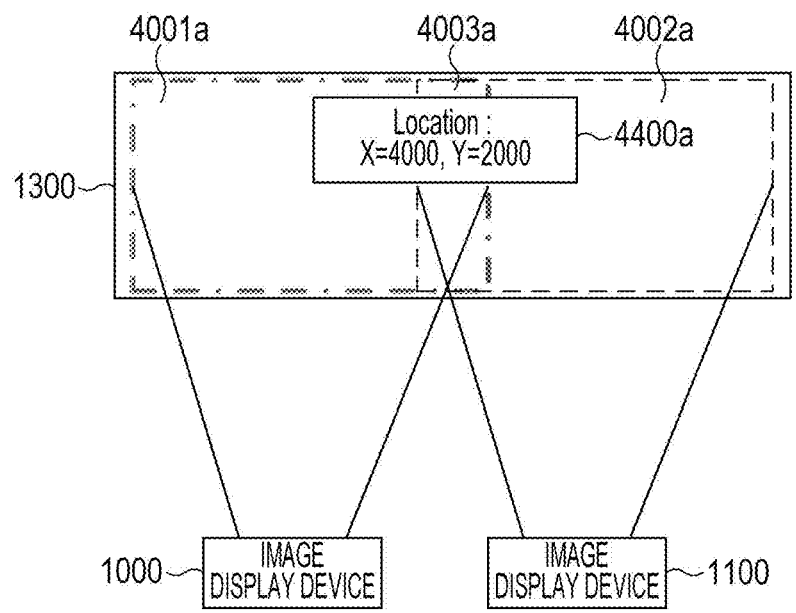
FIGS. 4A and 4B each illustrate an example of a display of a multi-screen menu.
Figure 4B:
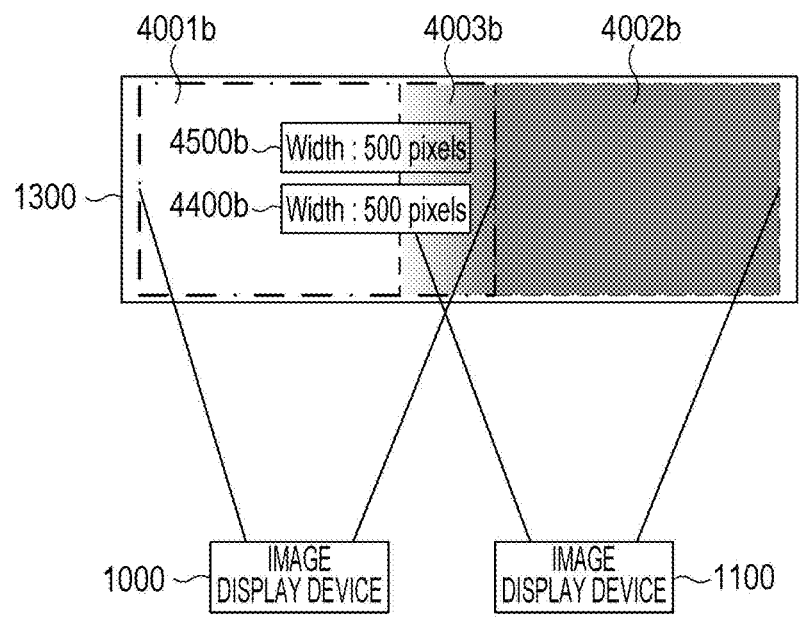

The multi-screen menu (adjustment menu) contains information indicating a configured setting of an overlapping image region, or information indicating a setting to which the user refers for configuring an overlapping image region. Specifically, the multi-screen menu (adjustment menu) contains, for example, information indicating a width of an overlapping image region as illustrated in FIG. 4B to be described, or information indicating a location (coordinates) of an overlapping image region within a multi-screen region as illustrated in FIG. 4A. The multi-screen menu (adjustment menu) displays, for example, information with at least any one of a figure, a symbol, a character, and a numeral.

The graphic superimposition unit 1020 receives the graphic signal GS generated by the graphic generation unit 1040 and a first selected signal SS1, which is an image signal selected by the image processing order change unit 1010. The graphic superimposition unit 1020 superimposes the graphic signal GS on the first selected signal SS1 and outputs the resultant signal as a graphic-superimposed signal GOS.

The overlapping region processing unit 1030 receives a second selected signal SS2, which is an image signal selected by the image processing order change unit 1010. The overlapping region processing unit 1030 subjects an overlapping image region of the second selected signal SS2 to luminance correction and outputs the resultant signal as an overlapping region-processed signal OSS.

The overlapping region processing unit 1030 can perform, as an example of luminance correction, a calculation using the following Equation (1) (electrical luminance correction). That is, in the case where luminance is reduced linearly toward an end of an image in the overlapping image region, an image signal Vo (luminance value) subjected to luminance correction is derived in consideration of a display γ, which is a predetermined coefficient.

$$Vo = ((x/W)^\gamma)^* Vi \qquad (1),$$

where Vi is an input image signal (luminance value), W is a width of the overlapping image region, and x is a distance from an image end of the overlapping image region. Note that a luminance correction method is not limited to the method of Equation (1).

A display mode signal DS is input to a first selection unit 1011, a second selection unit 1012 and an output selection unit 1013. The display mode signal DS is a signal indicating a display mode (state) of the image display device 1000. In this embodiment, the display mode signal DS is a signal indicating that the display mode of the image display device 1000 is one of at least two modes: a normal display mode that refers to a normal multi-screen projection state, and an adjustment display mode that refers to a multi-screen adjustment state. The adjustment display mode is an operation mode for adjustment of a multi-screen display. Alignment of image projection regions of a plurality of projectors is performed during the adjustment display mode. Furthermore, the normal display mode is an operation mode typically applied posterior to the adjustment display mode. That is, after alignment of the image projection regions of the plurality of projectors has been completed, the normal display mode is applied, and thus a multi-screen display is achieved.

Next, an example of the image processing order change unit 1010 will be described. The image processing order change unit 1010 includes the first selection unit 1011, the second selection unit 1012, and the output selection unit 1013.

The first selection unit 1011 receives an image signal IS output from the image output device 1200, an overlapping region-processed signal OSS output from the overlapping region processing unit 1030, and a display mode signal DS. The first selection unit 1011 selects one of the image signal IS and the overlapping region-processed signal OSS in accordance with the display mode signal DS and outputs it as a first selected signal SS1. In this embodiment, specifically, if a display mode indicated by the display mode signal DS is the normal display mode, the first selection unit 1011 selects the image signal IS. If the display mode indicated by the display mode signal DS is the adjustment display mode, the first selection unit 1011 selects the overlapping region-processed signal OSS.

The second selection unit 1012 receives an image signal IS output from the image output device 1200, a graphic-superimposed signal GOS output from the graphic superimposition unit 1020, and a display mode signal DS. The second selection unit 1012 selects one of the image signal IS and the graphic-superimposed signal GOS in accordance with the display mode signal DS and outputs it as a second selected signal SS2. In this embodiment, specifically, if a display mode indicated by the display mode signal DS is the normal display mode, the second selection unit 1012 selects the graphic-superimposed signal GOS. If the display mode indicated by the display mode signal DS is the adjustment display mode, the second selection unit 1012 selects the image signal IS.

The output selection unit 1013 receives a graphic-superimposed signal GOS, an overlapping region-processed signal OSS, and a display mode signal DS. The output selection unit 1013 selects one of the graphic-superimposed signal GOS and the overlapping region-processed signal OSS in accordance with the display mode signal DS and outputs it as an output signal OS to the image display unit 1050. In this embodiment, specifically, if a display mode indicated by the display mode signal DS is the normal display mode, the output selection unit 1013 selects the overlapping region-processed signal OSS. If the display mode indicated by the display mode signal DS is the adjustment display mode, the output selection unit 1013 selects the graphic-superimposed signal GOS.

Figure 3:
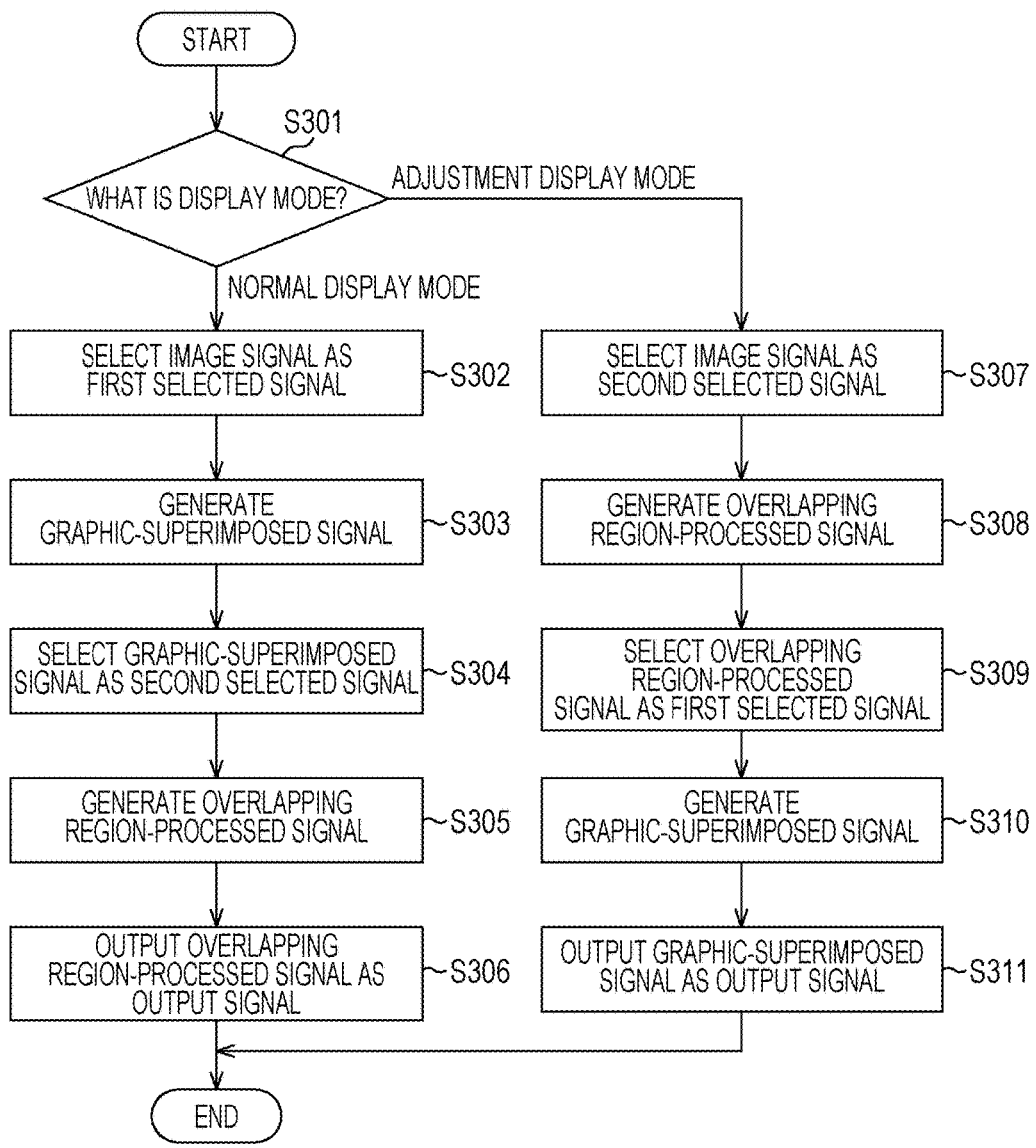
FIG. 3 is a flowchart illustrating an example of operations performed by the image display device.

Next, an example of operations performed by the image display device 1000 when a multi-screen display is achieved will be described with reference to a flowchart of FIG. 3. Operations performed by the image display device 1100 can be implemented with the same operations as those performed by the image display device 1000. Thus, operations performed by the image display device 1000 will now be described, and detailed descriptions of operations performed by the image display device 1100 are omitted.

First, in S301, the image display device 1000 determines whether a display mode indicated by a display mode signal DS is the normal display mode or the adjustment display mode. As a result of the determination, if the display mode indicated by the display mode signal DS is the normal display mode, the image display device 1000 proceeds to S302.

In S302, the first selection unit 1011 selects an image signal IS from among the image signal IS and an overlapping region-processed signal OSS and outputs, as a first selected signal SS1, the image signal IS to the graphic superimposition unit 1020.

Subsequently, in S303, the graphic superimposition unit 1020 superimposes a graphic signal GS generated as an OSD image by the graphic generation unit 1040 on the image signal IS that is the first selected signal SS1 to generate a graphic-superimposed signal GOS. Then, the graphic superimposition unit 1020 outputs the graphic-superimposed signal GOS to the second selection unit 1012.

Subsequently, in S304, the second selection unit 1012 selects the graphic-superimposed signal GOS and outputs, as a second selected signal SS2, the graphic-superimposed signal GOS to the overlapping region processing unit 1030.

Subsequently, in S305, the overlapping region processing unit 1030 subjects the graphic-superimposed signal GOS that is the second selected signal SS2 to luminance correction to generate an overlapping region-processed signal OSS. Then, the overlapping region processing unit 1030 outputs the overlapping region-processed signal OSS to the output selection unit 1013.

Subsequently, in S306, the output selection unit 1013 selects the overlapping region-processed signal OSS as an output signal OS and outputs it to the image display unit 1050.

Through operations performed by the first selection unit 1011, the second selection unit 1012, and the output selection unit 1013, an image signal IS input from the image output device 1200 is subjected to, in sequence, graphic superimposition processing and overlapping region processing. An output signal OS obtained through such processing is projected as an example of a first image onto the projection screen 1300 via the image display unit 1050. Then, the process represented by the flowchart of FIG. 3 ends.

FIGS. 4A and 4B each illustrate an example of a display of a multi-screen menu provided in such a manner as to partially cover each projection region constituting a multi-screen display. FIG. 4A illustrates an example of a display of a multi-screen menu provided at the time of the normal display mode. That is, FIG. 4A illustrates an example of a display of a multi-screen menu provided after alignment of overlapping image regions has been completed.

In FIG. 4A, a multi-screen display is provided by performing projection in such a manner that an overlapping image region 4003a of a left projection region 4001a projected by the image display device 1000 and an overlapping image region 4003a of a right projection region 4002a projected by the image display device 1100 overlap each other. On the multi-screen display, a multi-screen menu (adjustment menu) 4400a is superimposed.

As described above, the multi-screen menu (adjustment menu) 4400a is subjected to processing by, in sequence, graphic superimposition units 1020 and 1120 and overlapping region processing units 1030 and 1130 and is thus subjected to luminance correction similar to that to which an image of each overlapping image region 4003a is subjected. This makes a seam between images less noticeable.

Referring back to FIG. 3, in S301, if the display mode indicated by the display mode signal DS is the adjustment display mode, the image display device 1000 proceeds to S307.

In S307, the second selection unit 1012 selects an image signal IS from among the image signal IS and a graphic-superimposed signal GOS and outputs, as a second selected signal SS2, the image signal IS to the overlapping region processing unit 1030.

Subsequently, in S308, the overlapping region processing unit 1030 subjects the image signal IS that is the second selected signal SS2 to luminance correction to generate an overlapping region-processed signal OSS. The overlapping region processing unit 1030 outputs the overlapping region-processed signal OSS to the first selection unit 1011.

Subsequently, in S309, the first selection unit 1011 selects the overlapping region-processed signal OSS and outputs, as a first selected signal SS1, the overlapping region-processed signal OSS to the graphic superimposition unit 1020.

Subsequently, in S310, the graphic superimposition unit 1020 superimposes a graphic signal GS generated by the graphic generation unit 1040 on the overlapping region-processed signal OSS that is the first selected signal SS1 to generate a graphic-superimposed signal GOS. Then, the graphic superimposition unit 1020 outputs the graphic-superimposed signal GOS to the output selection unit 1013. In S311, the output selection unit 1013 selects the graphic-superimposed signal GOS as an output signal OS and outputs it to the image display unit 1050.

Through operations performed by the first selection unit 1011, the second selection unit 1012, and the output selection unit 1013, an image signal IS input from the image output device 1200 is subjected to, in sequence, overlapping region processing and graphic superimposition processing. An output signal OS obtained through such processing is projected as an example of a second image onto the projection screen 1300 via the image display unit 1050. Then, the process represented by the flowchart of FIG. 3 ends.

FIG. 4B illustrates an example of a display of a multi-screen menu provided at the time of the adjustment display mode. That is, FIG. 4B illustrates an example of a display of a multi-screen menu provided during alignment of overlapping image regions.

In FIG. 4B, assume that luminance correction of an overlapping image region 4003b of a left projection region 4001b is adjusted. For this reason, projection to a right projection region 4002b is not performed.

The image display device 1000 projects a multi-screen menu (adjustment menu) 4400b to the left projection region 4001b. To demonstrate the effect of this embodiment, FIG. 4B illustrates, together with the multi-screen menu (adjustment menu) 4400b, a multi-screen menu (adjustment menu) 4500b subjected to processing in a processing sequence of the normal display mode. That is, the multi-screen menu (adjustment menu) 4500b is actually not displayed. Other things are similar to those in FIG. 4A, and thus detailed descriptions thereof are omitted.

As described above, the multi-screen menu (adjustment menu) 4400b is projected only from the image display device 1000 that displays the left projection region 4001b. Thus, when processing is performed in the processing sequence of the normal display mode, of the multi-screen menu (adjustment menu) 4500b, luminance of a region partially covering the overlapping image region 4003b is reduced due to luminance correction performed by the overlapping region processing unit 1030. As a result, the visibility of the multi-screen menu (adjustment menu) 4500b is reduced.

On the other hand, as in the above-described adjustment display mode, when overlapping region processing and graphic superimposition processing are performed in sequence, a multi-screen menu (adjustment menu) is superimposed on an image previously subjected to luminance correction. Thus, the visibility of the multi-screen menu (adjustment menu) 4400b can be increased while checking a result of luminance correction of the overlapping image region 4003b to be adjusted.

As described above, in this embodiment, when adjustment of an overlapping image region is performed, an image signal IS is subjected to luminance correction, and then a graphic signal GS that is an image signal of a multi-screen menu (adjustment menu) is superimposed on the image signal IS. After adjustment of an overlapping image region has been completed, a graphic signal GS that is an image signal of a multi-screen menu (adjustment menu) is superimposed on an image signal IS and is then subjected to luminance correction. As a result, for example, extraction of a region of a multi-screen menu (adjustment menu) does not have to be performed, and an OSD image whose gradient simulates the gradient of an overlapping image region corresponding to a result of the extraction does not have to be created. Thus, when a multi-screen display is provided, such a simple configuration can make a seam between graphics (overlapping image regions) partially covering each projection region less noticeable and also increase the visibility of an adjustment menu during adjustment.

In the above-described embodiment, the example is primarily described in which, when switching between a selection made by the first selection unit 1011 and a selection made by the second selection unit 1012 is performed in accordance with whether a display mode is the adjustment display mode or the normal display mode, the visibility of an adjustment menu is kept from decreasing during the adjustment display mode. Note that the embodiment is not limited to this example. For example, a method may be adopted in which both an image for the adjustment display mode (an image in which luminance of an adjustment menu is not reduced) and an image for the normal display mode (an image in which luminance of an adjustment menu is reduced) are generated regardless of operation modes. In the case where this method is used, the image display device 1000 projects an image for the adjustment display mode during the adjustment display mode and projects an image for the normal display mode during the normal display mode. Such a configuration can also keep the visibility of an adjustment menu from decreasing during the adjustment display mode. Furthermore, another method is discussed. That is, with respect to an input image, adjustment processing is performed in which luminance of a portion corresponding to an overlapping region is reduced regardless of operation modes. On the other hand, with respect to an adjustment menu, luminance of a portion corresponding to the overlapping region is not reduced during the adjustment display mode, and luminance of a portion corresponding to the overlapping region is reduced during the normal display mode. Then, the resultant input image subjected to the adjustment processing and the resultant adjustment menu are combined and displayed. Such a configuration can also keep the visibility of an adjustment menu from decreasing during the adjustment display mode.

In this embodiment, as an example, the case where image display units 1050 and 1150 are respectively included in the image display devices 1000 and 1100 is described. However, the image display units 1050 and 1150 may be provided outside the image display devices 1000 and 1100.

In this embodiment, although image processing other than graphic superimposition processing and overlapping region processing is not described for the sake of simplicity of description, other image processing may be performed before and after the graphic superimposition processing and the overlapping region processing.

Second Embodiment

Next, a second embodiment will be described. In the first embodiment, as an example, the case where the graphic superimposition units 1020 and 1120 process respective signals selected by first selection units 1011 and 1111 and where the overlapping region processing units 1030 and 1130 process respective signals selected by second selection units 1012 and 1112 is described. That is, as an example, the case where the image display device 1000 includes one graphic superimposition unit 1020 and one overlapping region processing unit 1030 and where the image display device 1100 includes one graphic superimposition unit 1120 and one overlapping region processing unit 1130 is described. On the other hand, in this embodiment, as an example, the case where two graphic superimposition units and two overlapping region processing units are provided and where respective processing operations are performed without a selection made by a selection unit will be described. As just described above, this embodiment differs from the first embodiment primarily in some of the functional configuration in which graphic superimposition processing and overlapping region processing are performed. Thus, in the description of this embodiment, for example, components or parts that are the same as those in the first embodiment are denoted by the same reference numerals or symbols as those illustrated in FIGS. 1 to 4B, and detailed descriptions thereof are omitted.

Figure 5:
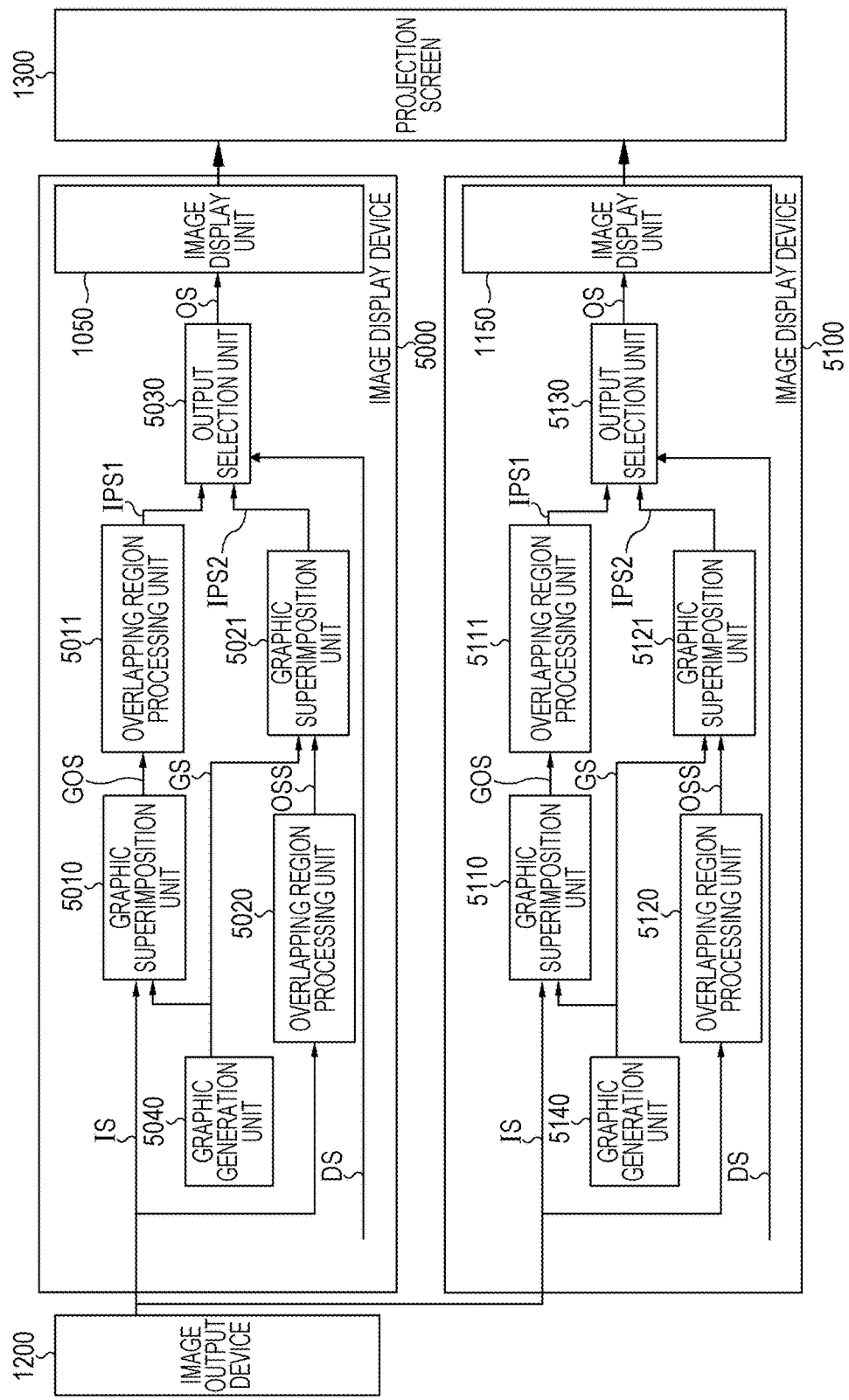
FIG. 5 illustrates a second example of the configuration of the multi-projection system.

FIG. 5 illustrates an example of the configuration of the multi-projection system. As in FIG. 1, FIG. 5 illustrates, as an example, the case where the multi-projection system outputs a multi-screen display with two image display devices 5000 and 5100.

The image display devices 5000 and 5100 each receive an image signal IS output from the external image output device 1200. The image display devices 5000 and 5100 each perform superimposition of an OSD image on the image signal IS and subjection of an overlapping image region to overlapping image processing. The image display devices 5000 and 5100 each project an image subjected to the superimposition of the OSD image and the overlapping image processing onto the projection screen 1300.

Hardware of the image display devices 5000 and 5100 can be implemented with, for example, the configuration illustrated in FIG. 2 described in the first embodiment. Thus, detailed descriptions of the hardware of the image display devices 5000 and 5100 are omitted herein. Furthermore, a functional configuration of the image display device 5100 can be implemented with the same functional configuration as that of the image display device 5000. Thus, a functional configuration of the image display device 5000 will now be described, and a detailed description of the functional configuration of the image display device 5100 is omitted.

The image display device 5000 includes graphic superimposition units 5010 and 5021, overlapping region processing units 5011 and 5020, an output selection unit 5030 and a graphic generation unit 5040. As in the first embodiment, in this embodiment, as an example, the case where a display mode signal DS is a signal indicating that a display mode of the image display device 5000 is one of at least two modes: the normal display mode and the adjustment display mode will be described.

The graphic generation unit 5040 generates a graphic, such as a multi-screen menu (adjustment menu), and outputs it as a graphic signal GS.

The graphic superimposition unit 5010 receives an image signal IS output from the image output device 1200 and the graphic signal GS generated by the graphic generation unit 5040. The graphic superimposition unit 5010 performs first superimposition processing. That is, the graphic superimposition unit 5010 superimposes the graphic signal GS on the image signal IS and outputs the resultant signal as a graphic-superimposed signal GOS.

The overlapping region processing unit 5011 receives the graphic-superimposed signal GOS. The overlapping region processing unit 5011 performs first correction processing. That is, the overlapping region processing unit 5011 subjects an overlapping image region of the graphic-superimposed signal GOS to luminance correction and outputs the resultant signal as a first image path output signal IPS1.

The overlapping region processing unit 5020 receives the image signal IS. The overlapping region processing unit 5020 performs second correction processing. That is, the overlapping region processing unit 5020 subjects an overlapping image region of the image signal IS to luminance correction and outputs the resultant signal as an overlapping region-processed signal OSS.

The processing performed by each of the overlapping region processing units 5011 and 5020 can be implemented by, for example, performing a calculation using Equation (1) described in the first embodiment.

The graphic superimposition unit 5021 receives the graphic signal GS generated by the graphic generation unit 5040 and the overlapping region-processed signal OSS generated by the overlapping region processing unit 5020. The graphic superimposition unit 5021 performs second superimposition processing. That is, the graphic superimposition unit 5021 superimposes the graphic signal GS on the overlapping region-processed signal OSS and outputs the resultant signal as a second image path output signal IPS2.

The output selection unit 5030 receives the first image path output signal IPS1 generated by the overlapping region processing unit 5011, the second image path output signal IPS2 generated by the graphic superimposition unit 5021, and a display mode signal DS. The output selection unit 5030 selects one of the first image path output signal IPS1 and the second image path output signal IPS2 in accordance with the display mode signal DS and outputs it as an output signal OS to the image display unit 1050. The output signal OS is projected onto the projection screen 1300 via the image display unit 1050.

In this embodiment, if a display mode indicated by the display mode signal DS is the normal display mode, the output selection unit 5030 selects, as an example of the first image, the first image path output signal IPS1 (image signal subjected to graphic superimposition and then overlapping region processing). On the other hand, if a display mode indicated by the display mode signal DS is the adjustment display mode, the output selection unit 5030 selects, as an example of the second image, the second image path output signal IPS2 (image signal subjected to overlapping region processing and then graphic superimposition).

Other things are the same as those in the first embodiment, and thus detailed descriptions thereof are omitted.

As in the above-described first embodiment, when a multi-screen display is provided, such a simple configuration can make a seam between graphics partially covering each projection region less noticeable and also increase the visibility of an adjustment menu during adjustment.

Furthermore, modifications described in the first embodiment can also be adopted in this embodiment.

Any of the above-described embodiments is merely an example of an embodiment for implementing the present invention, and the technical scope of the present invention is not to be construed in a limited manner due to the above embodiments. That is, the present invention may be implemented in various forms without departing from a technical idea thereof or a principal feature thereof.

When a plurality of images having respective regions overlapping each other are displayed to provide a single screen, the configurations according to the above embodiments can make a seam between the plurality of images less noticeable and increase the visibility of an image superimposed on images of the regions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-213179, filed Oct. 29, 2015, which is hereby incorporated by reference herein in its entirety.

What is claimed is:

1. An image output device which generates an output image signal representing an output image to be projected by a first projection unit, the first projection unit projecting a first image based on the output image signal so that a partial region in the first image overlaps a region of a second image projected by a second projection unit, the image output device comprising:

one or more memories storing instructions; and
one or more hardware processors which, when executing the instructions, causes the image output device to perform:
generating a graphic signal representing information indicating a width of an overlapping region in the first image with the region of the second image, wherein the graphic signal represents an image for supplying user information for setting the first projection unit and/or the second projection unit;
superimposing the graphic signal on the first image, and outputting a graphic-superimposed image;
processing to subject one of the overlapping region of the first image or the graphic-superimposed image to luminance correction, and outputting an overlapping-processed image;
receiving a mode signal indicating which one of predetermined operation modes is to be applied, the predetermined operation modes specifying a procedure for generating the output image signal and including a first operation mode and a second operation mode, wherein the first operation mode is a mode in which alignment of projection regions of a plurality of projection units is performed for a multi-screen display, and the second operation mode is a mode in which the alignment has been completed;
outputting, as the output image signal to the first projection unit, the overlapping-processed image output by the processing or the graphic-superimposed image output by the superimposing according to the operation mode; and
projecting the first image by the first projection unit based on the output image signal so that the partial region in the first image overlaps the region of the second image projected by the second projection unit,
wherein the graphic superimposed image is subjected to the luminance correction after the graphic signal is superimposed on the first image, and the overlapping-processed image subjected to the luminance correction is output as the output image signal, to the first projection unit, in a case where the predetermined operation mode indicated by the mode signal is the second operation mode; and
wherein the graphic signal is superimposed on the overlapping-processed image output after the first image is subjected to the luminance correction, and the graphic-superimposed image is output as the output image signal to the first projection unit, in a case where the predetermined operation mode indicated by the mode signal is the first operation mode.

2. The image output device according to claim 1, wherein in the case where the predetermined operation mode indicated by the mode signal is the second operation mode, the graphic signal in the first image to be projected by the first projection unit is subjected to the luminance correction using luminance gain that differs according to a position in the first image and, in the case where the predetermined operation mode indicated by the mode signal is the first operation mode, the graphic signal in the first image to be projected by the first projection unit is not subjected to the luminance correction using luminance gain that differs according to a position in the first image.

3. A control method for an image output device which generates an output image signal representing an output image to be projected by a first projection unit, the first projection unit projecting a first image based on the output image signal so that a partial region in the first image overlaps a region of a second image projected by a second projection unit, the method comprising:

generating a graphic signal representing information indicating a width of an overlapping region in the first image with the region of the second image, wherein the graphic signal represents an image for supplying user information for setting the first projection unit and/or the second projection unit;
superimposing the graphic signal on the first image to be projected by the first projection unit, and outputting a graphic-superimposed image;
processing to subject one of the overlapping region of an input image or the graphic-superimposed image to luminance correction, and outputting an overlapping region-processed image;
receiving a mode signal indicating which one of predetermined operation modes is to be applied, the predetermined operation modes specifying a procedure for generating an output image signal and including a first operation mode and a second operation mode, wherein the first operation mode is a mode in which alignment of projection regions of a plurality of projection units is performed for a multi-screen display, and the second operation mode is a mode in which the alignment has been completed;
outputting, as the output image signal to the first projection unit, the overlapping region-processed output by the processing or the graphic-superimposed image output by the superimposing according to the operation mode; and
projecting the first image by the first projection unit based on the output image signal so that the partial region in the first image overlaps the region of the second image projected by the second projection unit,
wherein the graphic-superimposed image is subjected to the luminance correction after the graphic signal is superimposed on the first image, and the overlapping region-processed image subjected to the luminance correction is output as the output image signal, to the first projection unit, in a case where the predetermined operation mode indicated by the signal is the second operation mode; and wherein the graphic signal is superimposed on the overlapping region-processed image output by the processing after the first image is subjected to the luminance correction, and the graphic-superimposed image is output as the output image signal to the first projection unit, in a case where the predetermined operation mode indicated by the mode signal is the first operation mode.

4. The control method according to claim 3, wherein in a case where the predetermined operation mode indicated by the mode signal is the second operation mode, the graphic signal in the output image to be projected by the first projection unit is subjected to the luminance correction using luminance gain that differs according to a position in the output image and, in a case where the predetermined operation mode indicated by the mode signal is the first operation mode, the graphic signal in the output image to be projected by the first projection unit is not subjected to the luminance correction using luminance gain that differs according to a position in the output image.

5. A non-transitory computer readable storage medium storing a program for causing a computer to execute a control method for an image output device which generates an output image signal representing an output image to be projected by a first projection unit, the first projection unit projecting a first image based on the output image signal so that a partial region in the first image overlaps a region of a second image projected by a second projection unit, the control method comprising:
   generating a graphic signal representing information indicating a width of an overlapping region in the first image with the region of the second image, wherein the graphic signal represents an image for supplying user information for setting the first projection unit and/or the second projection unit;
   superimposing the graphic signal on the first image to be projected by the first projection unit, and outputting a graphic-superimposed image;
   processing to subject one of the overlapping region of an input image or the graphic-superimposed image to luminance correction, and outputting an overlapping-processed image;
   receiving a mode signal indicating which one of predetermined operation modes is to be applied, the predetermined operation modes specifying a procedure for generating the output image signal and including a first operation mode and a second operation mode, wherein the first operation mode is a mode in which alignment of projection regions of a plurality of projection units is performed for a multi-screen display, and the second operation mode is a mode in which the alignment has been completed;
   outputting, as the output image signal to the first projection unit, the graphic-superimposed image output by the processing or the overlapping region-processed image output by the superimposing according to the operation mode; and
   projecting the first image by the first projection unit based on the output image signal so that a partial region in the first image overlaps the region of the second image projected by the second projection unit,
   wherein graphic superimposed image is subjected to the luminance correction after the graphic signal is superimposed on the first image, and the overlapping-processed image subjected to the luminance correction, is output as the output image signal, to the first projection unit, in a case where the predetermined operation mode indicated by the mode signal is the second operation mode; and
   wherein the graphic signal is superimposed on the overlapping region-processed image output after the first image is subjected to the luminance correction, and the graphic-superimposed image is output as the output signal to the first projection unit, in a case where the predetermined operation mode indicated by the mode signal is the first operation mode.

6. The non-transitory computer readable storage medium according to claim 5, wherein
   in the case where the predetermined operation mode indicated by the mode signal is the second operation mode, the graphic signal in the output image to be projected by the first projection unit is subjected to the luminance correction using luminance gain that differs according to a position in the output image and, in the case where the predetermined operation mode indicated by the mode signal is the first operation mode, the graphic signal in the output image to be projected by the first projection unit is not subjected to the luminance correction using luminance gain that differs according to a position in the output image.

7. The image output device according to claim 1, wherein the second operation mode is applied to the image output device for projection performed after alignment of the overlapping region.

8. The image output device according to claim 1, wherein a portion of the graphic signal in the output image corresponding to the overlapping region output by the outputting in the first operation mode is brighter than a portion of the graphic signal in the output image corresponding to the overlapping region output by the outputting in the second operation mode.

9. The image output device according to claim 1, further comprising:
   first selecting the input image or the overlapping-processed image output by the processing according to the mode signal and outputting the selected image; and
   second selecting the input image or the graphic-superimposed image output by the superimposing according to the mode signal and outputting the selected image.

10. The image output device according to claim 9, wherein the first selecting selects the overlapping-processed image and the second selecting selects the input image in a case where the mode signal indicating the first operation mode is received, and
    wherein the first selecting selects the input image output by the processing and the second selecting selects the image output by the superimposing in case where the mode signal indicating the second operation mode is received.

11. The image output device according to claim 1, wherein the superimposing includes:
   a first superimposing the graphic signal on the input image; and
   a second superimposing the graphic image on the overlapping-processed image output by the processing,
   wherein the processing includes:

a first processing to process the luminance correction on the input image and output the processed image to the second superimposing; and a second processing to process the luminance correction on an image output by the first superimposing, and wherein the outputting selects the image output by the first processing and outputs the selected image as the output signal in the first operation mode, and the outputting selects the image output by the second processing and outputs the selected image as the output signal in the second operation mode.

* * * * *